United States Patent [19]

Crow et al.

[11] 3,740,671

[45] June 19, 1973

[54] FILTER FOR THIRD-ORDER PHASE-LOCKED LOOPS

[75] Inventors: Robert B. Crow, Sierra Madre; Robert C. Tausworthe, Pasadena, both of Calif.

[73] Assignee: National Aeronautics & Space Administration, Washington, D.C.

[22] Filed: Apr. 6, 1972

[21] Appl. No.: 241,614

[52] U.S. Cl. .................. 333/70 CR, 331/17, 331/25

[51] Int. Cl. ............................................ H03h 7/06

[58] Field of Search .................... 333/70 R, 70 CR, 333/70 A; 329/50, 2; 331/25, 17, 1, 34

[56] References Cited

UNITED STATES PATENTS 3,626,301 12/1971 Develet, Jr. ........................ 329/50 X

*Primary Examiner*—Rudolph V. Rolinec
*Assistant Examiner*—Marvin Nussbaum
*Attorney*—Monte F. Mott, Paul F. McCaul and John R. Manning

[57] ABSTRACT

Filters for third-order phase-locked loops used in receivers to acquire and track carrier signals, particularly signals subject to high doppler-rate changes in frequency, are provided by employing a loop filter with an open-loop transfer function $$F(s) = (1 + \tau_2 s/1 + \tau_1 s) + 1/(1 + \tau_1 s)(\delta + \tau_3 s)$$

and, for a given set of loop constants, setting the damping factor equal to unity.

4 Claims, 7 Drawing Figures

$\tau_1 = (R_1 + R_2)C_1$ $\tau_2 = R_2 C_1$ $\tau_3 = R_3 C_2$ $\delta = R_3/R_4$ $k = \tau_2/\tau_3 = 1/4$ $\tau_1 = (R_1 + R_2)C_1$ $= R_5 C_3$ $\tau_2 = R_2 C_1$ $\tau_3 = R_3 C_2$ $\delta = R_3/R_4$ $k = \tau_2/\tau_3 = 1/4$ $\varepsilon = \tau_2/\tau_1$ $\tau_1 = (R_1 + R_2)C_1$ $\tau_2 = R_2 C_1$ $\tau_3 = R_3 C_4$ $\delta = R_3/R_4$ $k = \tau_2/\tau_3 = 1/4$

FILTER FOR THIRD-ORDER PHASE-LOCKED LOOPS

ORIGIN OF THE INVENTION

The invention described herein was made in the performance of work under a NASA contract and is subject to the provisions of section 305 of the National Aeronautics and Space Act of 1958, Public Law 85–568 (72 STAT. 435; 42 USC 2457).

BACKGROUND OF THE INVENTION

This invention relates to a third-order phase-locked loops, and more particularly to filters for third-order phase-locked loops for use in receivers to acquire and track carrier signals.

Second-order phase-locked receivers used in space exploration, both in the spacecraft and in the ground tracking stations, have performed their function with such an exceedingly pleasant effect that, up until now, there has been little or no reason to consider the installation of a more complicated system. Their performance characteristics have become well understood, analyzable, and easily optimized relative to almost any criterion in a straight forward, well-defined way. Their ability to track incoming signals over a great range of signal levels and doppler profiles, and to maintain lock and coherence at very low signal-to-noise ratios has become an accepted engineering fact.

As the more difficult deep space missions come into being, however, there is a corresponding stringency of requirement placed on the tracking instrument, and a corresponding need to reevaluate the best ways of performing the tracking function technically, economically, and operationally. Some missions are expected to have doppler rate profiles which may cause up to 30° steady-state phase error in the unaided second-order loops now implemented. Such stress in receivers decreases the efficiency with which command or telemetry data is detected (by 1.25 db. at 30°), makes acquisition of lock difficult and faulty, and increases the likelihood of cycle slipping and loss of lock.

The way to correct these problems is clear; eliminate or diminish the offending loop stress. This can be done by: widening the loop bandwidth; programming the uplink and downlink frequencies to correct these effects; or increasing the order of the tracking loop. Widening the loop bandwidth increases loop noises; hence it cannot be accepted as a general solution to loop-stress problem. Programming the uplink frequency and ground station local oscillator in accordance with the predicted doppler profile is certainly a valid solution, but is costly to implement and introduces difficulty in reducing the two-way doppler data for navigation purposes. It also may require accurate predictions during critical phases of a mission where an a priori doppler profile is uncertain. While a second-order loop might track a doppler ramp, once required, the mechanics of obtaining lock—sweeping the uplink exciter or downlink VCO, and switching to track mode—may possibly cause the system to lose lock.

A third-order loop, however, will track the actual phase deviations presented to it without the need for accurate predictions. It can thus be used in conjunction with, or exclusive of, a programmed-frequency-mode of operation. True, if the frequency swing is too wide during the track mode for one loop VCO to handle, it may be desirable to have some minor capability for changing the tracking range without breaking lock. But this need not require the use of an equipment as complex as a phase-programmed oscillator.

Raising the order of the loop to three would seem to be an ideal, even if only partial, alternative, because of its simplicity and possible economic factor.

The basic characteristics of third-order phase-tracking systems have been known since the first works of Jaffee and Rechtin reported in *Trans. IRE.* IT–1, pp 66–76 (March 1955). Andrew J. Viterbi in *Principles of Coherent Communications*, McGraw Hill Book Co., (1966) performs a phase-plane analysis, at pages 64–72, from which he concludes, quite correctly for his choice of parameters, that pull-in "is less stable for a third-order loop than for one of second order." His choice of parameters was a natural one, derived from linear (in-lock) optimization of that loop. Both sources point out that such a loop is potentially unstable, should loop parameters be chosen incorrectly.

Because of what seemed to be poor acquisition and stability characteristics third-order loops have not found wide application in the past. Design approach seemed more complicated and was not well understood. However, it has been discovered that these poor acquisitions and stability characteristics can be eliminated to the point that a loop of the third order can outperform a second-order loop, not only in its ability to track a frequency ramp with practically zero phase error, but also in its ability to acquire lock more quickly and from greater offsets, as well. Even when synthesized with imperfect integrators within the loop filter, the third-order system will out-perform a perfect second-order system by orders of magnitude improvement in steady state phase error, lock-in time, and pull-in range. One further advantage of the third-order system is that there is less of a requirement for high loop gains and long time constants than needed by the second-order loop to maintain small tracking errors.

Other advantages are: that the loop filter configuration is a simple extension of presently mechanized loops, so that modification to use a third-order loop filter is minor; that the role of the receiver operator subsequent to lock is essentially eliminated; that several bandwidths are not needed to acquire rapidly; and that frequency drifts in the loop VCO cause essentially no degradation in performance. This last advantage may remove the need to have the VCOs in ovens, and thereby further extend the usefulness of the system employing a third-order loop filter.

SUMMARY OF THE INVENTION

In accordance with the present invention a filter for a third-order phase-locked loop in receiver systems is provided with a transfer function $$F(s) = (1 + \tau_2 s/1 + \tau_1 s) + 1/(1 + \tau_1 s)\ (\delta + \tau_3 s) \qquad (1)$$

and for a given set of loop constants, the damping factor is set equal to unity.

DESCRIPTION OF THE PREFERRED EMBODIMENTS

Figure 1:
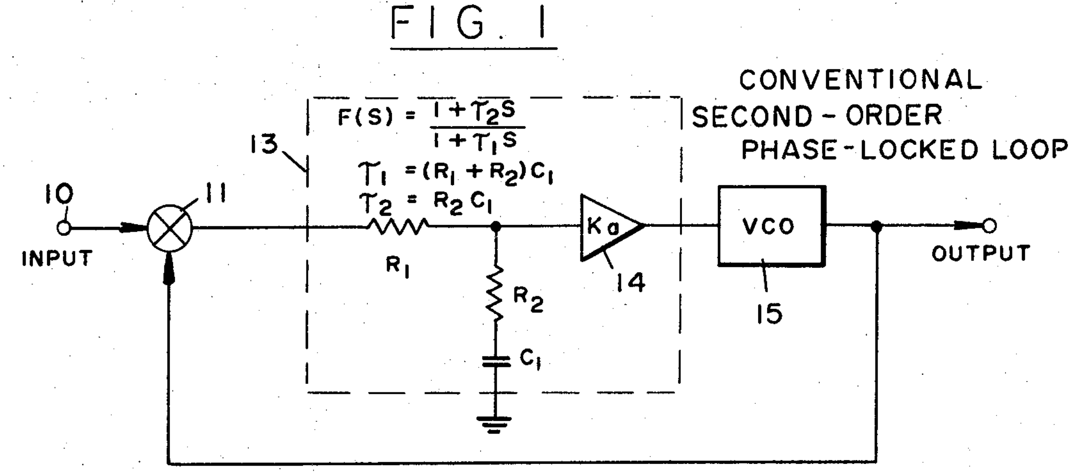
FIG. 1 is a diagram of a standard second-order phase-locked loop.

Before describing the present invention in greater detail, the performance of a standard second-order phase-locked loop shown in FIG. 1 will be described. It has the transfer function $$F(s) = (1 + \tau_2 s/1 + \tau_1 s) \quad (2)$$

usually built with $\tau_1 >> \tau_2$. For a given signal rms amplitude A and loop gain K, parameters r and $\epsilon$ are defined by the equations:

$$r = AK\, \tau_2^2/\tau_1 \quad (3)$$

$$\epsilon = \tau_2/\tau_1 \quad (4)$$

Nominally, then, $\epsilon$ is much smaller than unity.

The loop linear transfer function L(s) is given by the equation $$L(s) = [1 + \tau_2 s/1 + (1 + \epsilon/r)\, \tau_2 s + (1/r)\, (\tau_2 s)^2] \quad (5)$$

Its two-sided loop noise bandwidth, $w_L$ and damping factor, $\zeta$, are related to system parameters by the equations $$w_L = [r + 1/2\tau_2(1 + \epsilon/r)] \quad (6)$$

$$\zeta = (r^{1/2}/2)\, (1 + \epsilon/r) \quad (7)$$

Typically, $\zeta$ is set to take a particular value, $\zeta_o = 0.707$, at design signal level, $r = r_o = 2$.

Once the loop is locked, there is a steady-state phase error caused by doppler shifts:

$$\phi ss = \Omega_0/AK + \tau_1\Lambda_0/AK\, [1 - \epsilon - \epsilon^2/r + t/\tau_1] \approx [\tau_2^2\Lambda_0/r + \Omega(t)/AK] \quad (8)$$

This relation states the in-lock response to an input signal offset frequency $\Omega_0$ (in radians/sec) and doppler rate $\Lambda_0$ (in rad/sec$^2$) relative to the VCO rest frequency. The term $\Omega(t)=\Omega_0+\Lambda_0 t$ is the instantaneous frequency offset. The response in Eq. 8 excludes the transient terms associated with the poles of $L(s)$.

It may be noted in Eq. 8 that there is an error term growing linearly in time that eventually may force the loop out of lock over an extended period of doppler-rate tracking. Raising the loop gain helps to minimize this effect of $\Omega(t)$; but raising the gain is ineffective in reducing the error due to $\Lambda_0$.

The maximum initial VCO offset $\Omega_{(max)}$ for which the loop will automatically pull into lock is approximately given by $$\Omega_{(max)} = (r/\tau_2)(2\tau_1/\tau_2)^{1/2} \quad (9)$$

In operation, the phase-locked loop of FIG. 1 receives a signal at input terminal 10 and mixes it with a local oscillator signal through a mixer (multiplier) 11 having a gain $K_d$. The produce is coupled to the loop filter 13 having the transfer function of Eq. (2). The output stage of the filter 13, an amplifier 14, has a gain $K_a$ and is connected to the control terminal of a voltage-controlled oscillator (VCO) 15. The mixer and filter cooperate in developing an output signal that is proportional to the phase difference between the input signal and the VCO signal even when the input signal is phase — or frequency — modulated.

The filter 13 is of the second-order loop may be mechanized in a number of different ways using perfect or imperfect integrators. In either case the root loci for the phase-locked-loop transfer functions are circles which lie in the left hand plane, indicating unconditional stability. If the filter were replaced by a third-order loop, two of the loci would emanate at 60° from the cluster of three openloop poles with the real axes into the right half-plane until the product AK of received signal and loop gain exceed a certain valve. Consequently, the loop is only conditionally stable.

Figure 2:
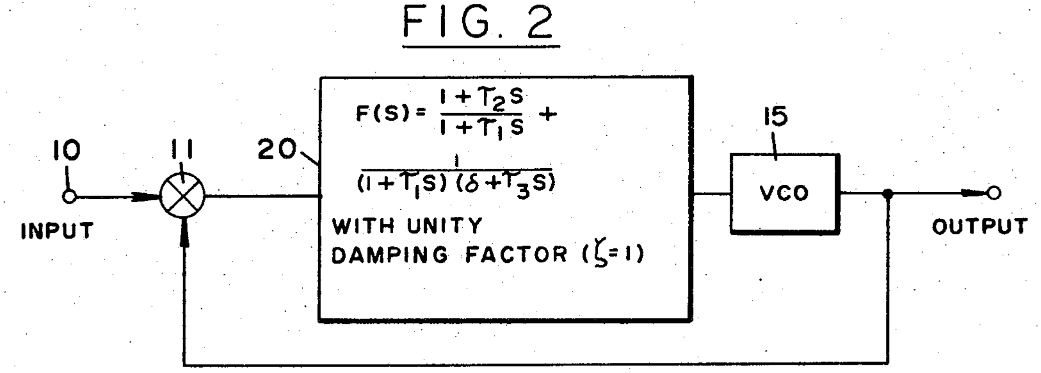
FIG. 2 is a general block diagram illustrating the present invention.

FIG. 2 illustrates a third-order loop implemented in accordance with the present invention with a filter 20 having a transfer function according to Eq. (1) set forth hereinbefore and a unity damping factor ($\zeta = 1$). The remaining components are the same as in FIG. 1 and therefore identified by the same reference numerals. With a damping factor equal to one, instead of a damping factor of 0.707 as had been the standard practice in third-order loops, the acquisition and stability characteristic is improved so that a third-order loop exceeds the performance of a second order loop in the ability to acquire lock more quickly and from greater offsets and to track with practically zero phase error.

To better understand and appreciate this invention, consider the following. When minimizing the total transient distortion plus noise variance by the Wiener filtering technique, one is led to the following loop filter for tracking an input $\theta(t) = \Lambda_0 t^2/2$:

$$F(s) = (1 + \tau_2 s/\tau_1 s) + (1/2\tau_1\tau_2 s^2) \qquad r = 2 \quad (10)$$

The first part of this filter resembles that used in the ideal second-order loop. Based on this resemblance, one may conceive a two-stage loop design; acquisition by the second-order loop, to avoid any of the problems a third-order system out of lock might have, and subsequent addition of the other pole in Eq. 10 to remove loop stress. Such a configuration is useful for unattended receivers; henceforth it will be referred to as a hybrid design.

The perfect integrators indicated in Eq. 10 are not usually practical, so modifications are necessary. The loop filter to be considered in the remainder of this report may be synthesized in many ways, four of which are shown in FIGS. 3, 4, 5, and 6. These all have the same transfer function given by Eq. (1), and for convenience common circuit elements will be referred to by common reference numerals in order to be able to speak about all configurations in common when appropriate. Each of the configurations shown is a functional design.

The isolation amplifiers are high-input impedance devices, considered to have unity gain. However, this constraint can be relaxed to optimize hardware considerations. The coefficient $\delta$ is the reciprocal of the imperfect "integrator" dc gain and is usually very small. Even though $\epsilon$ and $\delta$ will usually be very small in designs, they will not be omitted in the formulas to follow with this loop filter. The loop transfer function takes the form $$L(s)=\frac{rk(1+\delta)+r(1+\delta k)\tau_2 s+r(\tau_2 s)^2}{rk(1+\delta)+(r+r\delta k+\epsilon\delta k)\tau_2 s+(r+\epsilon+\delta k)(\tau_2 s)^2+(\tau_2 s)^3} \quad (11)$$

The parameter $k$ above is defined as $$k=\tau_2/\tau_3=1/4 \quad (12)$$

The four designs of FIGS. 3 to 6 all have the same $L(s)$ and thus operate identically once the loop is locked; they differ in their lock-in transient behaviors, however, because of the possibly different initial capacitor voltages. If all capacitors are shorted at $t=0$, they are again identical, within hardware limitations. But when the loop is operating as a hybrid, (that is, as second order with capacitors $C_2$ or $C_2$ and $C_3$ shorted) during the acquisition phase, and third order ($C_2$ or $C_2$ and $C_3$ released) after lock, then each of the filters will exhibit a different transient phenomenon because of the placement and number of capacitors. These phenomena will be discussed more fully hereinafter.

Figure 4:
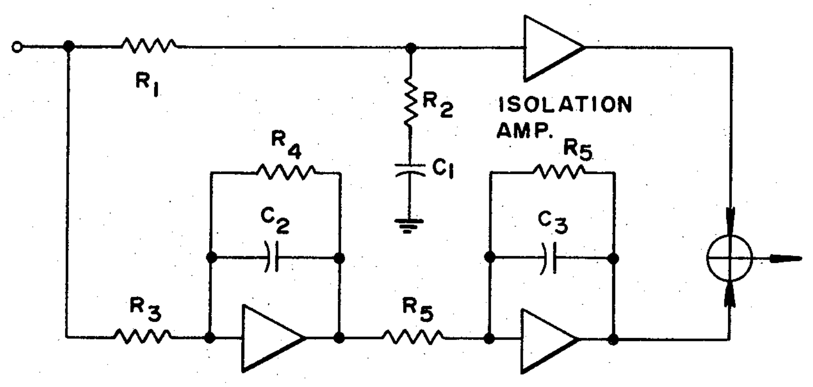

It is important to note for the circuit of FIG. 4 that the first integrator of the lower leg has unity dc gain and $R_5C_3=\tau_1$; it could as well have been synthesized by a simple ($R_5$, $C_3$) voltage divider, as in the upper leg. As it stands, its transfer function is one yielding an $F(s)$ with only two poles. By increasing the resistance shunting $C_3$ (thus raising the integrator gain), one can conceivably further reduce the steady state tracking error, but the number of poles in $F(s)$ then increases to three, and the loop becomes one of the fourth order.

Loop Noise Bandwidth

The standard method for computing loop bandwidth is by integration of $|L(j\omega)|^2$, a form contained in a table of integrals. The result is $$w_L=\frac{r}{2\tau_2}\left[\frac{r-k+1+\epsilon k/r+\delta k\,[(r+\epsilon+\delta k)(1+1/r)+k/r]}{r-k+\epsilon+\delta k\,(1+\epsilon/r)(r+\epsilon+\delta k)}\right] \approx\frac{r}{2\tau_2}\left[\frac{r-k+1}{r-k}\right] \quad (13)$$

As compared with the loop bandwidth formula of the second-order loop, the simplified expression in Eq. 12 is only slightly increased in complexity and, of course, the two merge to the same result as $k\to 0$.

The chief determining factors of $w_L$ are still $\tau_2$ and $r$, just as in the second-order loop. The phase error variance of any two loops due to input noise is the same as long as their loop bandwidths are the same.

Root Loci

For a given set of loop constants $\epsilon$, $\tau_2$, $\delta$, and $k$, it is possible to vary the loop gain, K, or signal level A and plot the positions of the poles of $L(s)$. Since $r$ is proportional to both A and K, it may be used as the independent variable. The system roots start at the poles of $F(s)$ at $r=0$ and finally terminate at the zeros of $F(s)$, $$\tau_2 s_{1,2}=-(1+\delta k/2)\pm[(1+\delta k/2)^2-(1+\delta)k]^{1/2} \quad (14)$$

as $r\to\infty$. When $k$ takes the value $$k_0=\left(\frac{2+\delta}{\delta^2}\right)\left\{1-\left[1-\frac{\delta^2}{(2+\delta)^2}\right]^{1/2}\right\}\approx\frac{1}{2(2+\delta)} \quad (15)$$

Then both zeros merge on the negative real axis at $$s_1=s_2=-(1+\delta k/2\tau_2) \quad (16)$$

If $k$ is less than $k_0$, the two zeros are complex, and their real parts are equal to Eq. 16.

The condition that $L(s)$ has a pair of critically damped roots is met when $r$, $k$, $\epsilon$, $\delta$ satisfy the following:

$$\text{define}\quad\begin{cases} w=r+\delta k(r+\epsilon)\\ v=r+\epsilon+\delta k\end{cases}$$

$$k=[1/(1+\delta)r](v/3)^3\,[1+(1-3w/v^2)^{1/2}]^2[1-2(1-3w/v^2)^{1/2}] \quad (17)$$

In order that critical damping occur at a real and positive $k$ in Eq. 17, $v$ and $w$ are restricted by the inequality $$1/4\leq w/v^2\leq 1/3 \quad (18)$$

Critically damped system roots can thus occur only if $3\lesssim r\lesssim 4$, dependent on $\epsilon$, $\delta$, and $k$. At the $r\approx 4$ extreme, k becomes zero and the system degenerates to a second-order loop. The maximum value of k allowing critical damping occurs at the $r\approx 3$ point and satisfies $$k_{max}=[1/(1+\delta)r](r+\epsilon+\delta k_{max}/3)^3 \qquad 3w=v^2 \quad (19)$$

Figure 7:
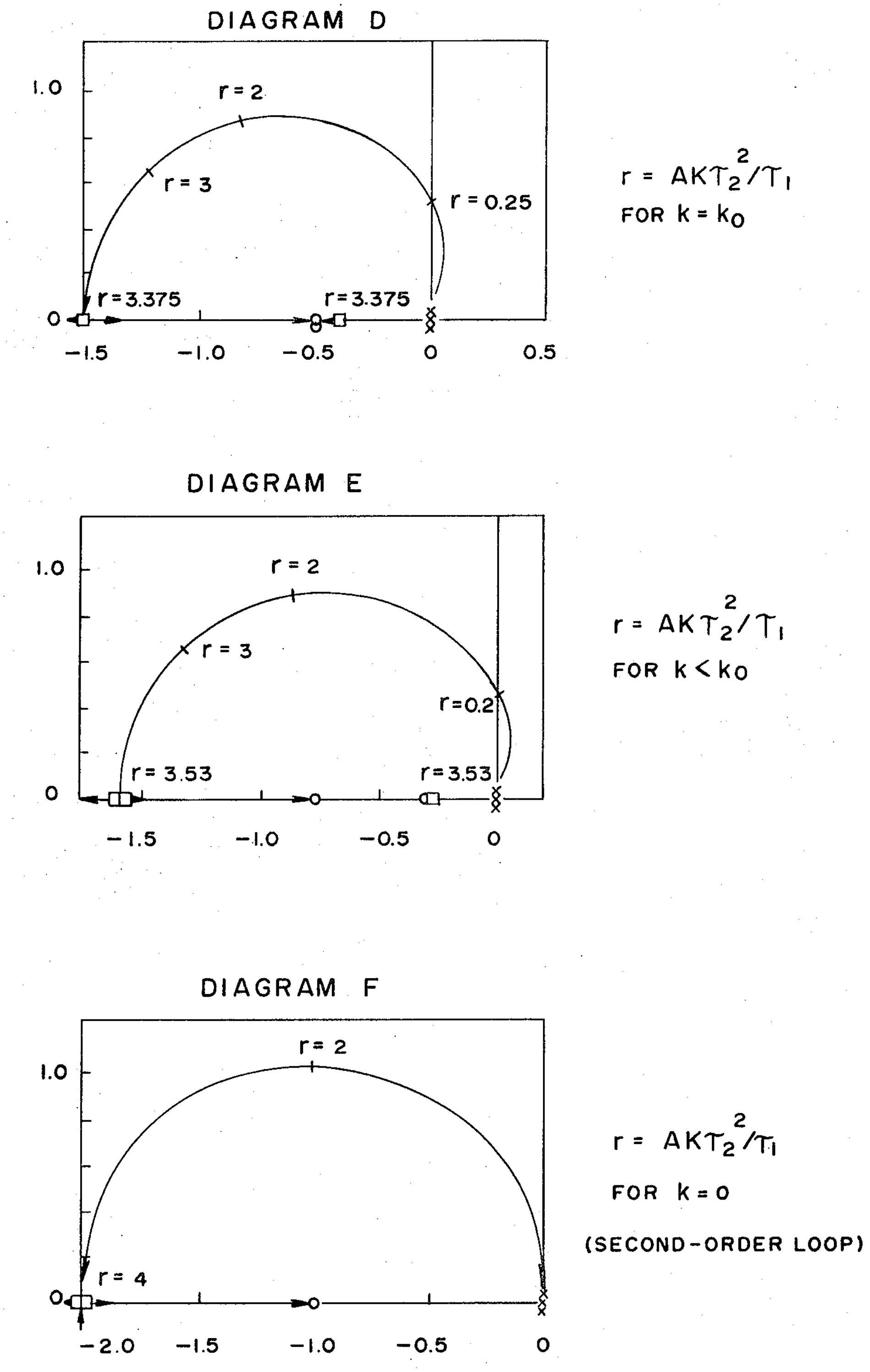
FIG. 7 diagrams A through F are root-loci diagrams useful in understanding the present invention.

As illustrated in root-loci diagrams of FIG. 7, there is generally a region of unstable system roots. The angular frequency $\omega_x$ at which the system roots cross the $j$-axis, is given by $$\omega_x = (1/\tau_2)\{r_{osc}[1 + \delta k(1 + \epsilon/r_{osc})]\}^{1/2} \approx r_{osc}^{1/2}/\tau_2 \qquad (20)$$

and occurs when $r$ takes the value described as follows:

$$\text{define}\begin{cases} a = 1 + \delta k \\ b = (1 + \delta) - \epsilon\delta k - (\epsilon + \delta k)(1 + \delta k) \\ c = \epsilon\delta k(\epsilon + \delta k) \end{cases} \qquad (21)$$

$$r_{osc} = \frac{b + [b^2 - 4ac]^{1/2}}{2a} \approx k - \epsilon - \delta k^2$$

The value of k thus sets the minimum $r = AK\,\tau_2^2/\tau_1$ at which the loop is stable; for any operating level with $r \geq r_{osc}$ there is a power-gain margin of $$\text{gain margin} = (r/r_{osc})^2 \approx [r/(k - \epsilon - \delta k^2)]^2 \qquad (22)$$

The six loci diagrams illustrated in FIG. 7 show, for various increasing values of $k$: in diagram $A$ that when $k > k_{max}$, there are two underdamped (complex) and one overdamped (real) roots for all $r > r_{osc}$; in diagram B that when $k = k_{max}$ there are two underdamped and one overdamped roots for all $r > r_{osc}$ except at $r \approx 3$, at which point all three roots become equal; in diagram C that when $k_0 < k < k_{max}$) there is a region where two roots pass from underdamped, to critically damped, to overdamped, to critically damped, and finally to underdamped cases; and in diagram D at $k = k_0$, the system roots are always critical or overdamped for r larger than about 3.3. The diagram E is similar to the previous case of diagram D, except there is a root nearer the origin, indicating a more sluggish response, when $k < k_0$. In the case of diagram E, the zero cancels the pole near the origin, producing a second-order loop at $k = 0$.

The cases illustrated in diagrams B and D are of special interest. Diagram B depicts the maximum value of $k$ (viz., $k_{max}$) that can be used when no underdamped roots are desired. In such a design, there is only one fixed operating signal level (i.e., $r \approx 3$). Diagram D shows the maximum value of $k$ (viz., $k_0$) that can be used if no underdamped roots are desired at any signal level above a design point producing $r_0 = 3.375$. The significance of these cases will be discussed fully hereinafter.

Steady-State Error

The system response to an input phase $\theta(t) = \theta_0 + \Omega_0 t + \Lambda_0 t^2/2$ can be found by considering the Laplace transform of the phase error $$\Phi(s) = [1 - L(s)][(\theta_0/s) + (\Omega_0/s^2) + (\Lambda_0/s^3)] \qquad (23)$$

The final-value theorem readily establishes the steady-state behavior. In terms of $\Omega(t) = \Omega_0 + \Lambda_0 t$, the instantaneous frequency offset, we have $$\phi_{ss} = \left(\frac{\delta}{1+\delta}\right)\frac{\Omega(t)}{AK} + \frac{\Lambda_0\tau_1}{AK}\left[\frac{1}{(1+\delta)^2}\right]\left[\frac{\epsilon}{k} + \delta\,(1 + \delta - \delta\epsilon - \delta\epsilon^2/r)\right] \approx \frac{\delta\Omega(t)}{AK} + \frac{\Lambda_0\tau_1}{AK}\left[\frac{\epsilon}{k} + \delta\right] \qquad (24)$$

Compared with the corresponding expression for a second-order loop, the error due to instantaneous frequency offset is reduced by a factor of about $\delta$, and the error caused by a frequency rate is diminished by a factor of about $(\delta + \epsilon/k)$. Such a comparison reflects the desirability not only of making $\epsilon$ and $\delta$ very small, but also of keeping $k$ as large as other factors will permit.

It is also clear that the third-order loop makes a minimal demand on loop gain; low values of $K$ in the second-order loop, on the other hand, are generally intolerable, except when frequency offsets are not at issue.

Transient Behavior Within Lock Region

Consider now the behavior of the loop error at the final stages of acquisition as the loop enters the linear region. Such a state may have been achieved by natural pull-in, by sweeping the VCO until zero-beat occurs, or by a hybrid lock-on. Choose the initial instant of such observation as $t = 0$, at which time the input phase function relative to the VCO is $$\theta(t) = \theta_0 + \Omega_0 t + \tfrac{1}{2}\Lambda_0 t \qquad (25)$$

$$\Phi(s) = (\theta_0/s) + (\Omega_0/s^2) + (\Lambda_0/s^3)$$

for appropriately defined values of $\theta_0$, $\Omega_0$, and $\Lambda_0$.

The capacitors $C_i$ in $F(s)$ will have initial voltage values which will be denoted $v_{oi}$. The transient responses of each of the three configurations in FIGS. 3, 4, and 5 are similar and all of the form $$\Phi(s) = [1 - L(s)]\left\{\Theta(s) - \frac{K'}{s}\left[\frac{U_1}{1+\tau_1 s} + \frac{U_2}{(1+\tau_1 s)\,(\delta+\tau_3 s)} + \frac{U_3}{\delta+\tau_3 s}\right]\right\} \qquad (26)$$

$K$ denotes the gain from the output of $F(s)$ outward to $\hat{\theta}$. The coefficients $U_i$ take values set by the initial capacitor voltages, as given in the following table.

Figure 3:
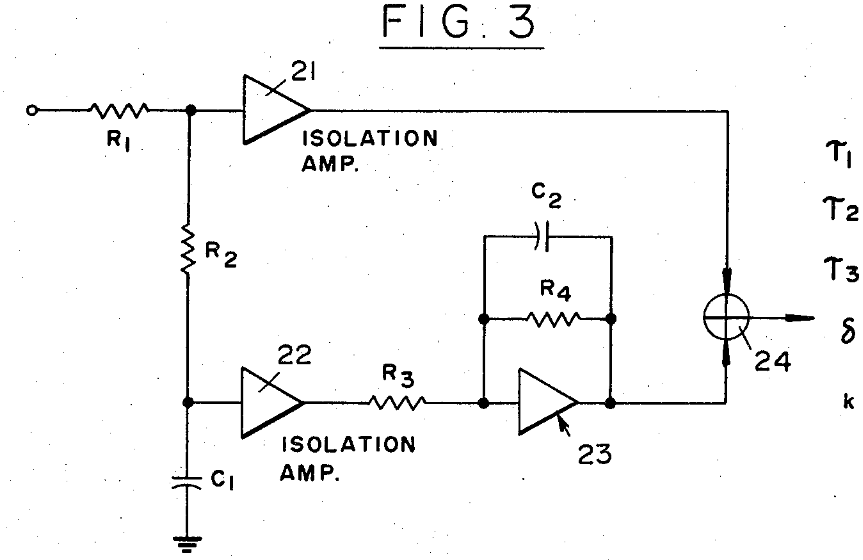
Figure 5:
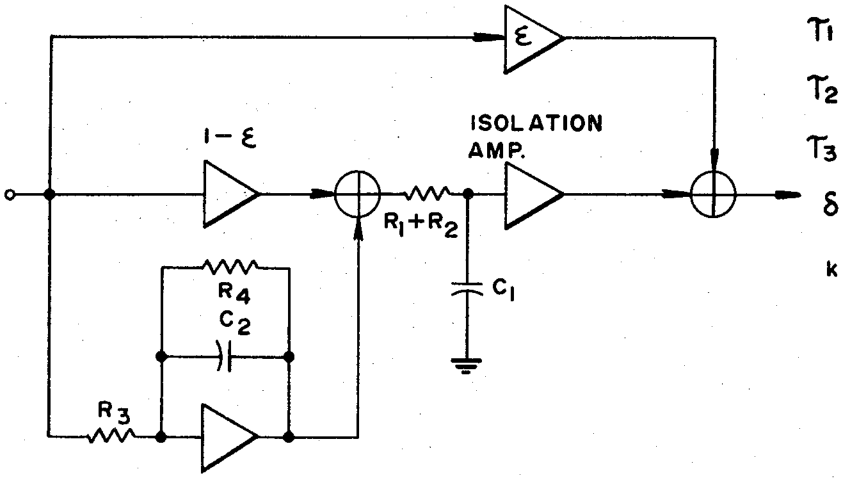

| Circuit | $U_1$ | $U_2$ | $U_3$ |
|---|---|---|---|
| FIG. 3 | $v_{01}\tau_1(1-\epsilon)$ | $v_{01}\tau_1$ | $v_{02}\tau_3$ |
| FIG. 4 | $v_{01}\tau_1(1-\epsilon)$ | $v_{02}\tau_1$ | $v_{03}\tau_3$ |
| FIG. 5 | $v_{01}\tau_1(1-\epsilon)$ | $v_{02}\tau_3$ | 0 |

For hybrid-loop configuration, $v_{02}$ and $v_{03}$ are zero initially, so circuits of FIGS. 3 and 4 have the same theoretical transient behavior. At the time of switching, there is only one capacitor charged, and there is only one transient term associated with $v_{01}$, namely $U_1$. When there is a tuning offset $\Omega_0$ at switch time, for example, this capacitor voltage is $v_{01} = \Omega_0/K$.

The phase error at this time, being that of the second-order loop, sets the initial offset at $$\theta_0 = (\Omega_0/Ak) + (\Lambda_0\tau_1/AK)\ (1 - \epsilon - \epsilon^2/r) \quad (27)$$

The third-order loop transient which results appears much the same as that shown by curve I in FIG. 8. The optimized transient, with about 31 percent overshoot, quickly reduces the phase error to its vastly improved new final value (Eq. 24).

A circuit of FIG. 3 used as a hybrid, on the other hand, has an extra transient, as $v_{01}$ enters both $U_1$ and $U_2$. In fact, the added effect, shown by curve II in FIG. 8, can knock the loop back out of lock! This can be expected to occur if $\phi$ reaches about 1 radian (linear theory), which corresponds to $\pi/2$ radians (nonlinear theory); the maximum usable $\Omega_0$ for the circuit of FIG. 3 is thus limited to approximately $$\Omega_0 < 2.97 w_L \quad (28)$$

Such a restriction allows us to conclude that circuit of FIG. 3 is not generally suitable for hybrid loop design. But, as pointed out earlier, circuits of FIGS. 4 and 5 make excellent hybrids. One may note in these figures that a loop initially locked, or at zero phase error with C's discharged, may lose lock if the $\Omega_0$ and $\Lambda_0$ introduced are excessive. If lock is broken, the linear loop theory becomes invalid, and the loop reverts back to is nonlinear state.

Acquisition and Lock-In Behavior

The phase-plane technique, which found welcome use in visualizing the lock-in behavior of second-order loops, does not readily extend the same advantage to third-order systems, partly because there are three initial conditions — phase, frequency, and frequency rate — which are needed to specify a unique trajectory, and partly because this trajectory lies in a 3-dimensional, difficult to imagine hyperplane.

By analogy, however, one still can visualize that, if there is a beat frequency between the incoming sinusoid and the VCO, there will be a small dc voltage at the filter output tending to force the loop toward lock. The extra integration in the loop accumulates this force, accelerating the loop toward lock. There is thus an understandable reduction in the time required to reach the zero-beat lock-in region and there is a corresponding increase in the loop pull-in-frequency range, as compared to a second-order system.

If loop damping is not set properly, the great velocity acquired by the loop phase and the momentum associated with the two integrations of the error may carry the loop frequency error past the lock region, perhaps out of lock so rapidly that recovery is not possible.

Proper setting of the damping factor — that is, optimum choice of the design point $r$ and $k$ — can reduce this velocity through the zero-beat region enough to prevent any frequency overshoot or irrecoverable loss of lock. In fact, if the loop has no underdamped roots, there is no transit past zero-beat at all.

To minimize the possibility that acquisition is faulty, it is merely necessary to choose an appropriate damping factor for two of the system poles. To minimize overshoot, damping should be critical or beyond, and to minimize $\phi_{ss}$ once lock is achieved, $k$ should be as large as possible. These two conditions are met in slightly different ways according to the type of signals to be tracked. If design is to be for signals of a fixed level, then $k$ should be set to $k_{max}$ and $r$ should be set to produce critical damping at this level (see diagram B of FIG. 7). If design is to be for signals of various intensities, then $k$ should be made equal to $k_0$ and r should be set for critical damping (see diagram D of FIG. 7) at the weakest expected signal level to ensure that the roots are never underdamped.

The theory developed for computing the pull-in range of a second-order loop is easily extended to account for effects in the third-order loop; the maximum input frequency offset which the loop will acquire unaided is approximately $$\Omega_{0(max)} = (r/\tau_2)\ \sqrt{(2\tau_1/\tau_2)\ (1 + \delta/\delta)} \quad (29)$$

The case $\delta = \infty$ gives the usual expression for second-order acquisition range.

It is clear then, that there is enhancement in the acquisition range by approximately the square root of the added integrator dc gain. In fact, experimental evidence verifies this formula exceedingly well all the way out to the point where IF filtering or minute equipment bias imperfections begin to limit the loop pull-in.

Noise Detuning of the VCO (Out of Lock)

Consider the case now in which acquisition is attempted with the loop filter capacitors having the initial random charges deposited in them by the input noise prior to application of signal. It is convenient to separate the deviations of the VCO output frequency by noise into two portions: That part coming through the second-order loop filter portion of $F(s)$, and the other part the balance. In terms of the input noise two-sided density $N_0$ and loop gain $K$, the variances $\rho_a^2$ and $\rho_b^2$, respectively, of these two parts are $$\sigma_a^2 = [\epsilon(AK)^2 N_0/2\tau_2 A^2]\ (1 - \epsilon^2 + 2\epsilon\ w_H \tau_2) \quad (30)$$

$$\sigma_b^2 = \frac{\epsilon\,(AK)^2\,(N_0/A^2)}{2\tau_2\delta\,(\delta + \epsilon/k)} \quad (31)$$

The parameter $w_H$ is the I.F. or pre-detection bandwidth. For nominally small $\epsilon$ and $\delta$, we can see that the deviations caused in the second-order leg may be very small, compared to those caused by the added integrator.

Prior to application of signal, the capacitors have attained charges that deviate the VCO from its rest frequency, essentially by $\rho_b$ rad/sec, and such deviation is perhaps $1/\delta$ times as large as it is for a second-order loop with the same loop gain $K$. This comparison is somewhat unfair, as it fails to recognize the increased tracking capability of the third-order system.

To judge performance between second- and third-order systems fairly, it is necessary to raise the gain of the second-order loop by $1/\delta$ to equate the static phase errors due to $\Omega_0$ (there will be little change in the second-order loop's ability to track $\Lambda_0$, however). The noise detuning of both loops are now reasonably comparable:

$$\sigma_2^2/\sigma_3^2 \approx (1 + 2\epsilon\, w_H\, \tau_2)(1 + \epsilon/\delta k) \tag{32}$$

$$> 1$$

The $\sigma_n^2$ here refers to the noise frequency-detuning of second and third order loops with equal $r_1$, $\tau_2$, etc., even though in practice the two realizations may require these to be somewhat different.

The important point of Eq. 32 is that there is no penalty in noise detuning, for a given $\Omega_0$ requirement, by synthesis as a third-order loop. In fact, when $\delta k<\epsilon$, there can be a marked improvement.

In either case, however, a stringent $\Omega_0$-tracking requirement creates excessive noise detuning, and thereby, an acquisition problem. For this reason, a spacecraft, or other unattended receiver, is probably best synthesized as a hybrid configuration. The hybrid need not be a second/third switch—it can be third/third, switching from a moderately high $\delta$ to a very low one. However, because of the transient phenomena causing unlock, mentioned earlier, the filter of FIG. 3 should not be used.

Effect of Internal and *VCO* Noise

The effect of *VCO* and other noises internal to the loop can be modeled as an equivalent noise voltage, $n_v(t)$, appearing at the *VCO* input; $K_{VCO}n_v(t)$ is then the output frequency noise. Such noise can usually be modeled spectrally by the equation $$K^2{}_{VCO}S_{n_v n_v}(j\omega) = N_{0v} + N_{1v}\ |2\pi/\omega| \tag{33}$$

The first term is a white noise internal to the loop and the second is the so-called "flicker" noise having a $1/f$ characteristic so typical of varactor diodes, carbon resistors, and oscillators in general. The amount of phase error in the closed loop output due to this noise can be found by the formula $$\sigma^2_{VCO} = \frac{1}{\pi}\int_0^{\infty} |1 - L\ (j\omega\ |^2 \left[\frac{N_{0v}}{\omega} + \frac{2\pi N_{1v}}{\omega^3}\right] d\omega \tag{34}$$

The first of these integrals is tabulated, and the other can be evaluated numerically. The case $\epsilon = \delta = 0$ produces the expression $$\sigma^2_{VCO} = \left[\frac{r\ (r+1-k)}{4\ (r-k)^2}\right]\frac{N_{0v}}{w_L} + g(r)\,\frac{N_{1v}}{w_L^2} \tag{35}$$

The form of $\sigma^2{}_{VCO}$ greatly resembles the corresponding equation for second-order loops. At $k = 0.25$, $r = 3.375$, the phase error variance is about 10 to 15 percent higher than it is for the second order loop. Hence, there is no relaxation in the requirement for spectral purity in the VCO to be used. But there are other noises in the VCO not well modeled spectrally; one such deviation is a steady drift in rest frequency due to some change in the oscillator operating condition, such as temperature, bias voltage, etc. These appear, so far as the loop error detector can tell, as slight alterations to the frequency offset or rate of the incoming sinusoid. Such effects can be analyzed as part of the loop overall transient. Because the third-order loop minimizes the effect of such transients, the drift requirement on VCOs may be greatly relaxed.

Third-Order Loop Design

When a set of loop gains, time constants, etc., is given, performance can be analyzed by the foregoing equations, or it can be measured by any suitable technique. It is also possible to turn performance specifications into loop parameters. Unless $\epsilon$ and $\delta$ are very small, designs must be taken from normalized figures and tables, or found by solution of the transcendental equations involving non-negligible $\epsilon$ and $\delta$. But, as is the usual case, if only first-order terms in $\epsilon$ and $\delta$ are pertinent, then there are simplified formulas that can be used.

Assume that the given set of design specifications consists of (1) the loop bandwidth, $w_{L0}$, at a minimum expected signal level $\Lambda_0$, (2) the maximum loop stress $\phi_{ss}$ that may be tolerated at a maximum frequency offset $\Omega_0$ and/or doppler rate $\Lambda_0$, (3) the maximum practical operating loop gain, $K_{max}$ that may be used at maximum input signal level, (4) a maximum time constant $\tau_{1max}$ conveniently realizable, and (5) a minimum allowable value of $\delta_{min}$. ($\delta_{min}$ can usually be extremely small, limited only by the gain of an operational amplifier; but it may be considerably larger if the noise detuning in an unattended mode is considered.) Included in this list of specifications is the tacit assumption that a variable-signal-level-tracker is to be designed. There is only one choice for k that will proscribe underdamped roots: $k = k_0$. The value of $k_0$ is approximately 0.25, but depends on an as-yet undetermined value $\delta$ (see Eq. 15).

The corresponding value of design point $r$; call it $r_0$, can be determined from Eq. 17, but only in terms of as-yet unspecified $\delta$ and $\epsilon$. In similar fashion, $\tau_2$ results from solving Eq. 13, again as a function of $\delta$ and $\epsilon$. The remaining parameter values are straightforward.

If the design were for a fixed signal level, $k$ would be set to $k_{max}$, and the corresponding $r$ given by Eq. 19, as previously described. Both of these designs depend on as-yet undetermined values of $\delta$ and $\epsilon$. The unused design parameters are used to fix $\delta$ and $\epsilon$ so that a design can be made.

The normalized phase errors caused separately by a frequency offset $\Omega_0$ and frequency ramp $\Lambda_0$ are given by the equations:

$$\frac{\phi_{ss}}{(\Omega_0/w_L)} = \frac{\delta\epsilon}{2\ (1+\delta)}\left(\frac{r-k+1+\epsilon k/r+\delta k[\ (r+\epsilon+\delta k)\ (1+1/r)+k/r]}{r-k+\epsilon+\delta k\ (1+\epsilon/r)\ (r+\epsilon+\delta k)}\right) \approx \frac{\delta\epsilon}{2}\left(\frac{r-k+1}{r-k}\right) \tag{36}$$

$$\frac{\phi_{ss}}{(\Lambda_0/w_L^2)} = \frac{r}{4\ (1+\delta)^2}\left(\frac{r-k+1+\epsilon k/r+\delta k\ [\ (r+\epsilon+\delta k)\ \ (1+1/r)+k/r]}{r-k+\epsilon+\delta k\ (1+\epsilon/r)\ (r+\epsilon+\delta k)}\right)^2 \times\left[\frac{\epsilon}{k}+\delta\ (1+\delta-\delta\epsilon-\delta\epsilon^2/r)\right] \approx \frac{r}{2}\left(\frac{r-k+1}{r-k}\right)^2\left(\frac{\epsilon}{k}+\delta\right) \tag{37}$$

which are totally specified once $\delta$ and $\epsilon$ take fixed values. Therefore, the two normalized errors can be tabulated, or plotted, as a function of $\delta$ and $\epsilon$.

The design procedure then is as follows:

1. For estimating purposes, approximate $\hat{r}_0 = 3.375$ and $\hat{k}_0 = 0.25$. Compute approximate minimum achievable $\epsilon = \epsilon_{min}$ values:

$$\epsilon_{\min} \approx \frac{\hat{r}_0}{4w_{L_0}\tau_{1\max}}\left(\frac{\hat{r}_0-\hat{k}_0+1}{\hat{r}_0-\hat{k}_0}\right) \quad (38)$$

or else $$\epsilon_{\min} \approx \frac{2w_{L_0}(\hat{r}_0-\hat{k}_0)}{A_0K_{\max}(\hat{r}_0-\hat{k}_0+1)} \quad (39)$$

whichever is larger.

2. Determine values $\delta \geq \delta_{min}$ and $\epsilon \geq \epsilon_{min}$ from Eq. 37, that will satisfy the static-phase error requirement.
3. Compute $k_0$, $r_0$, and $\tau_2$ by solving Eqs. 15, 17, and 13 directly.
4. Compute the remaining system parameters:

$$\tau_1 = \tau_2/\epsilon$$
$$\tau_3 = \tau_2/k_0$$
$$A_0K = r_0/\epsilon\tau_2$$
$$r_{osc} \approx k - \epsilon - \delta k^2 \quad (40)$$

$$\text{gain margin} = (r/r_{osc})^2$$
$$f_{osc} \approx (r_{osc}^{1/2}/2\pi\pi\tau_2) \quad (41)$$

As a shortcut, it is possible to take the values $r_0 = 3.375$ as correct within 1 percent whenever $\epsilon < 0.01$ and $\delta < 0.1$; the value $k_0 = 0.25$, if $\delta < 0.02$. The relation $$\tau_2 = 2.2275/w_{L_O} \quad (42)$$

is correct within 1 percent for $\epsilon \leq 0.01$ and $\delta \leq 0.1$. To avoid a lengthy expression, we may define the parameters $a = \epsilon + \delta k$
$b = \epsilon\delta k$
$c = r + \epsilon + \delta k$
$d = r(1 + \delta k) + \epsilon\delta k$
$e = rk(1 + \delta)$
$f = (bd - ae)/e^2$
$g = (bcd - ace - be)/e^2$
$h = (e^2 - bce - ade + bd^2)/e^2$ Then for all $k > 0$, $e_T^2$ takes the value $$e_T^2 = \frac{\Lambda_\delta^2\tau_2^5}{2}\left[\frac{df^2+g^2-2fh+ch^2/e}{cd-e}\right] \quad (43)$$

Analysis of Eq. 43 at a given fixed $w_L$, $\delta$ and $\epsilon$ reveals that $e_T^2$ has two stationary points: a true minimum in the vicinity of $k = \epsilon$, $r = 1$, and a relative minimum at about $k = 0.5$, $r = 2$. Even though the former case represents the least transient error, it is not useful, as the steady-state phase error is the same excessive value as it is for the second-order loop. The latter case is the one to be chosen for design, as it gives the true third-order loop optimization at a k large enough to combine low transient error with low steady-state phase error. However, even this disappears for about $\epsilon > 0.03$.

Since diminution of steady-state error is the primary reason for using a third-order loop, it thus is reasonable not to allow $k_h$, the hybrid design value, to drop below either $k_0$ or $k_{max}$, depending on the signal level characteristics being assumed.

The open-loop transfer function given by Eq. 1 is one for which an optimum value for k has been established for which the loop will be unconditionally stable for all higher values of signal level, that is, for the root-loci diagram D of FIG. 7. The manner in which that transfer function is implemented is obvious from the circuit diagrams of FIGS. 3, 4 and 5. In FIG. 3, for example, the first term is implemented in the same manner as for a second-order loop filter by resistors $R_1$ and $R_2$, and capacitor $C_1$. The output taken from an isolation amplifier 21 is then added to the second term. An isolation amplifier 22 providing the signal which is processed by an integration 23 having a gain $\delta = R_3/R_4$ to produce the signal of the second term. An adder 24 then simply adds the two terms.

Manipulation of the transfer function set forth in Eq. 1 yields the configuration of FIGS. 4 and 5. Many more configurations can be devised by still other manipulations of Eq. 1. Accordingly, the configuration of FIG. 3 is intended to merely show a direct approach to the task of implementing the transfer function. It is not the most desirable configuration because the charge on capacitor $C_1$ after acquisition is related to the loop frequency mistuning, $\Omega_o = 2\ \pi\Delta f$. It causes a transient which, if too large, can knock the loop irrecoverably out of lock. The configurations of FIGS. 4 and 5 exhibit no such transient away from lock and thus are preferred even though more complex. A simpler, and therefore even better configuration is that shown in FIG. 6 comprised of simply two cascaded intergrators 31 and 32. In each case, however the component values are selected to yield the required values of $\tau_1$, $\tau_2$, $\epsilon$ and dc gain $\delta$ for the desired bandwidth given by Eq. 13 and steady state phase error given by Eq. 24.

Figure 6:
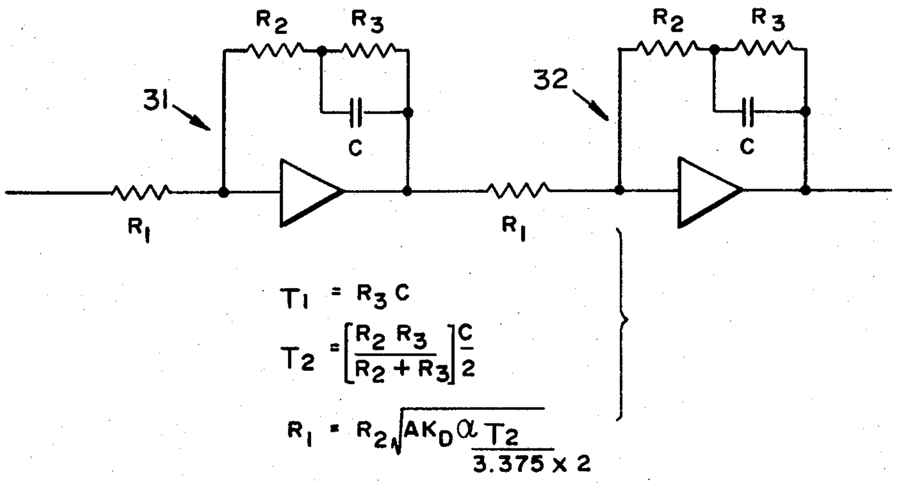
FIGS. 3, 4, 5 and 6 are simplified diagrams of filter circuits for the present invention.

To better understand the preferred configuration of FIG. 6 shown in terms of $T_1$ and $T_2$ instead of $\tau_1$ and $\tau_2$, the transfer function of Eq. 1 can be expressed as $$F'(s) = [(1 + T_2s)(1 + T_4s)/(1 + T_1s)(1 + T_3s)] \quad (44)$$

where $T_1 = \tau_1$
$T_3 = \tau_3/\delta$
$T_2T_4 = (\tau_2\tau_3/1 + \delta) \approx \tau_2\tau_3$
$T_2 + T_4 = (\delta\tau_2 + \tau_3/1 + \delta) \approx T_3$ Restricting the transfer function to one having real zeroes, i.e., one satisfying the equation, yields $$T_2T_4/(T_2 + T_4)^2\ ¼ \quad (45)$$

yields $T_2 = T_4 = \tau_3/2 = 2\tau 2$. The open-loop transfer function of Eq. 44 can then be written as $$F'(s) = [(1 + T_2s)^2/(1 + T_1s)(1 + T_3s)] \quad (46)$$

It can be shown that the steady-state phase error given by Eq. 24 is minimized when $T_1 = T_3$. Therefore, substituting $T_1$ for $T_3$ in Eq. 46 provides the transfer function $$F'(s) = (1 + T_2s)^2/(1 + T_1s)^2 \quad (47)$$

Two integrators, each having the transfer function $(1 + T_2s)/(1 + T_1s)$, may then be employed to implement Eq. 47 which is equivalent to Eq. 1 for the same condition of critical damping.

Although particular embodiments of the invention have been described and illustrated herein, it is recognized that modification and variations may readily occur to those skilled in the art. It is therefore intended that the claims be interpreted to cover such modifications and variations.

What is claimed is:

1. A filter for a third-order phase-locked loop in receiver systems, said filter having a transfer function substantially equal to $$F(s) = (1 + \tau_2s/1 + \tau_1s) + 1/(1 + \tau_1s)(\delta + \tau_3s)$$

and, for a given set of loop constants, having a damping factor set equal to unity, said loop constants including desired bandwidth and steady-state phase error.

2. A filter as defined in claim 1 wherein said transfer function is expressed by the equivalent equation $$F'(s) = [(1 + T_2s)(1 + T_4s)/(1 + T_1s)(1 + T_3s)]$$

wherein $$T_2T_4/(T_2 + T_4)^2 = 1/4$$

and $$T_1 = T_3$$

such that said equivalent transfer function is equal to $$F'(s) = (1 + T_2s)^2/(1 + T_1s)^2$$

whereby implementation is by two cascaded integrators, each having the transfer function $(1 + T_2s)/(1 + T_1s)$.

3. In a third-order phase-locked loop for use in receivers to acquire and track carrier signals, a loop filter with an open-loop transfer function equal to $$F(s) = (1 + \tau_2s/1 + \tau_1s) + 1/(1 + \tau_1s)(\delta + \tau_3s)$$

and, for a given set of loop constants, having a damping factor set equal to unity, said loop constants including desired bandwidth and steady-state phase error.

4. A loop filter as defined in claim 3 wherein said transfer function is expressed by the equivalent equation $$F'(s) = [(1 + T_2s)(1 + T_4s)/(1 + T_1s)(1 + T_3s)]$$

wherein $$T_2T_4/(T_2 + T_4)^2 = 1/4$$

and $$T_1 = T_3$$

such that said equivalent transfer function is equal to $$F'(s) = (1 + T_2s)^2/(1 + T_1s)^2$$

whereby implementation is by two cascade integrators, each having the transfer function $(1 + T_2s)/(1 + T_1s)$.

* * * * *